Nov. 20, 1934.  F. B. ROBERTS  1,981,197
METHOD AND APPARATUS FOR DRYING FRUIT
Filed May 19, 1931  3 Sheets-Sheet 3
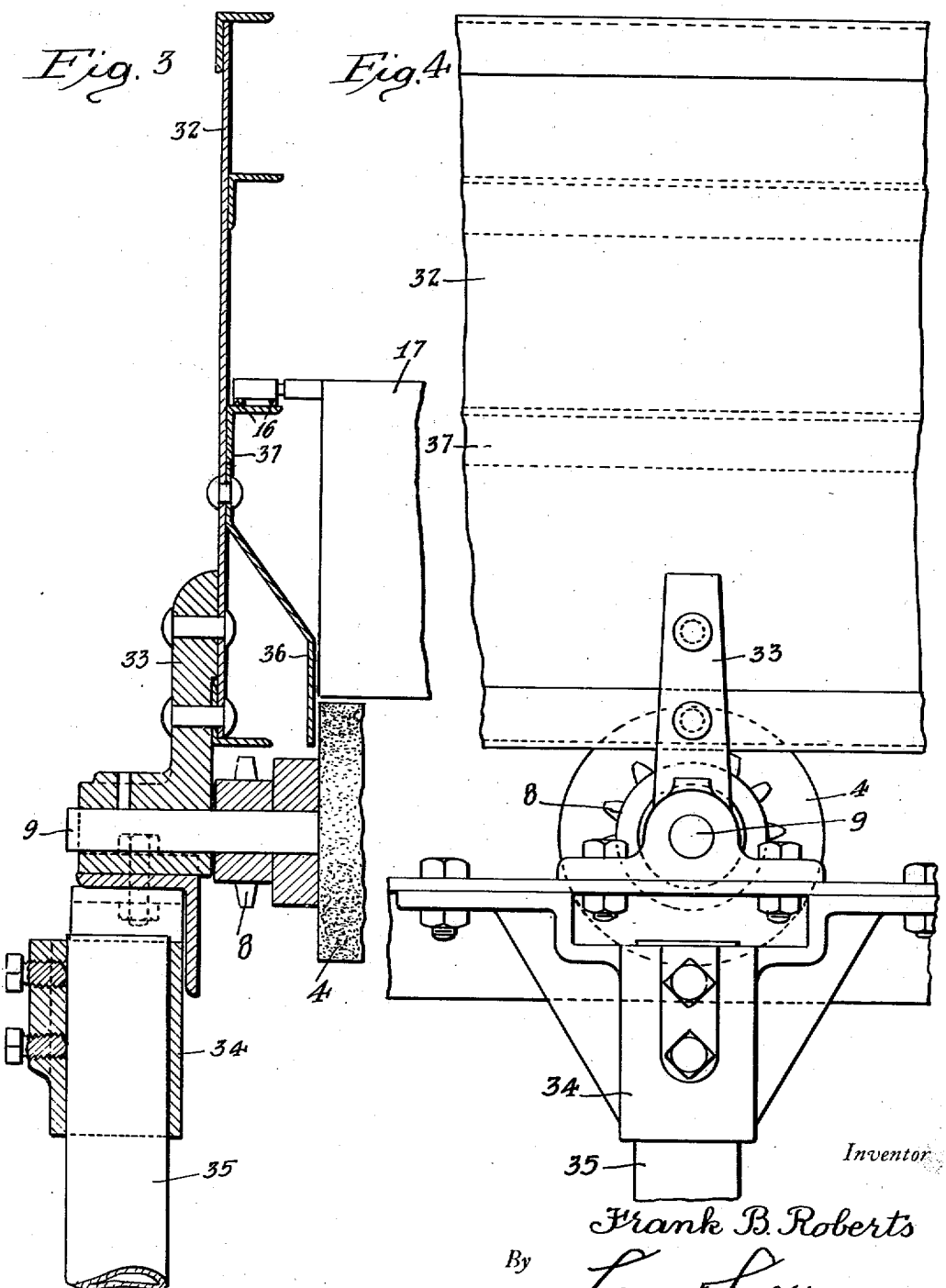
Inventor
Frank B. Roberts
By Lyon & Lyon
Attorneys Patented Nov. 20, 1934

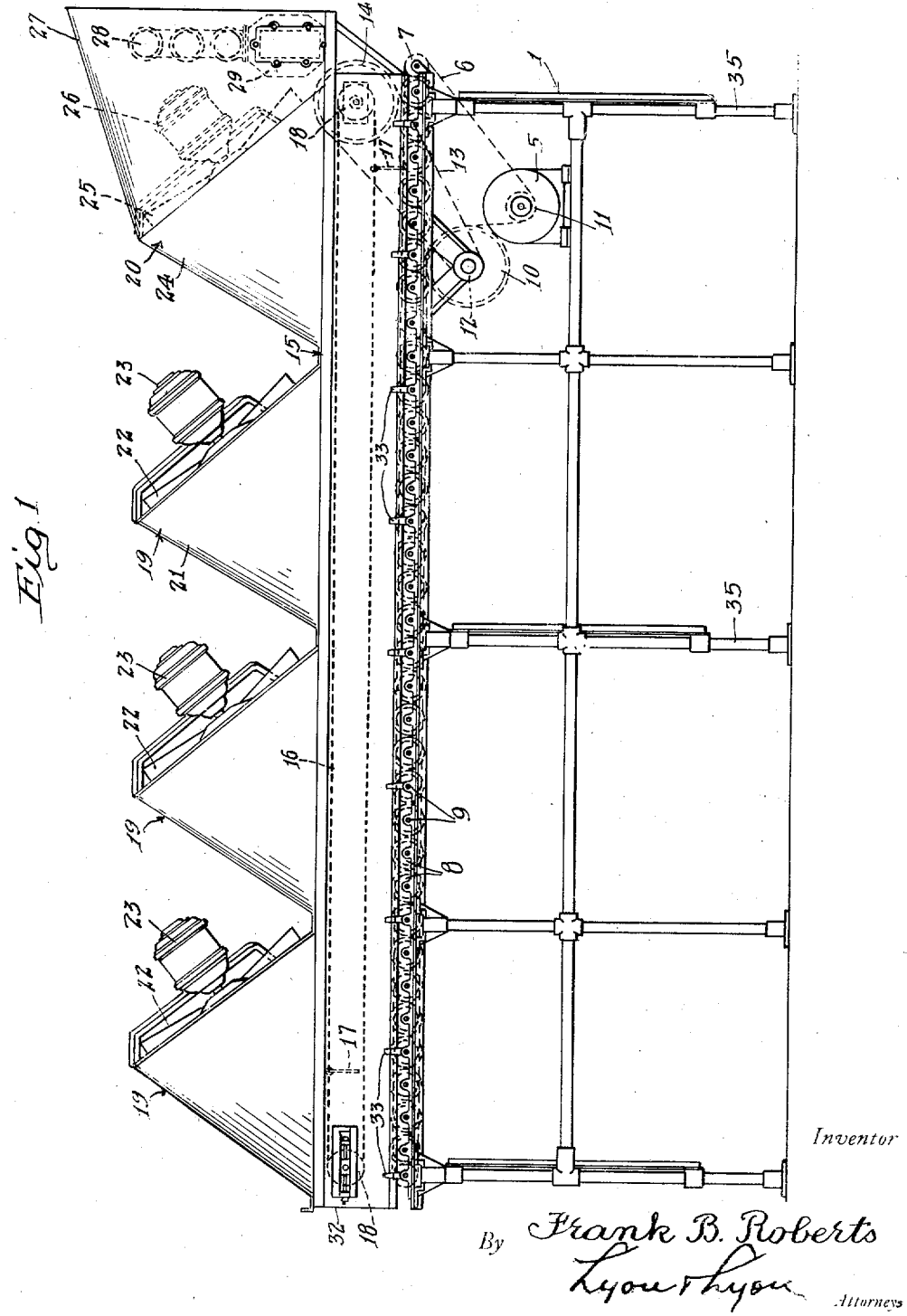

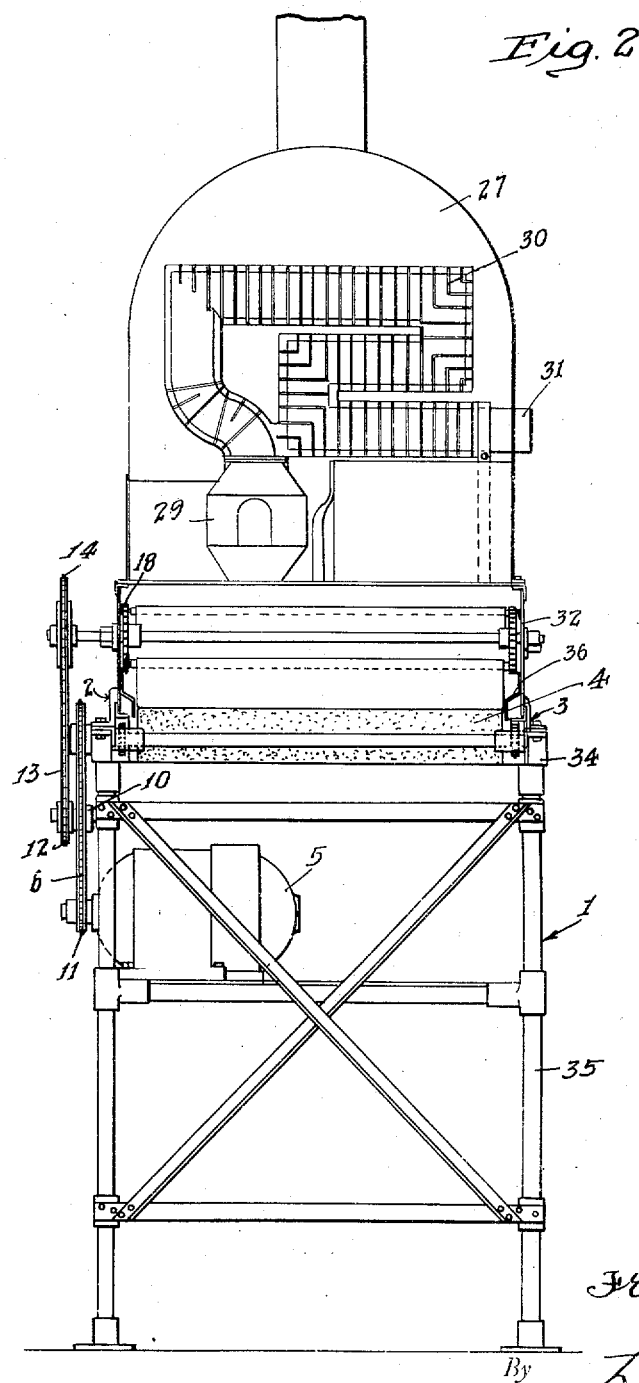

1,981,197

UNITED STATES PATENT OFFICE 1,981,197

METHOD AND APPARATUS FOR DRYING FRUIT

Frank B. Roberts, Anaheim, Calif., assignor to Food Machinery Corporation, San Jose, Calif., a corporation of Delaware Application May 19, 1931, Serial No. 538,462

11 Claims. (Cl. 34—12)

This invention relates to a method and apparatus for drying fruit such, for example, as citrus fruit. In the drying of fruit it has heretofore been the practice to pass the fruit over a table of rollers, and to subject the fruit so moving to a current of air to vaporize the water in the skin of the fruit. This method of drying fruit requires drying tables of great length, and requires the fruit being subjected to blasts of air over a relatively long period of time, necessitating excessive handling of the fruit.

It is an object of this invention to provide a method of drying fruit which will materially reduce the handling of the fruit, reduce the time required for the drying of the fruit, and will make possible reduction of the length and/or size of the apparatus over which the fruit is caused to pass during the drying operation.

Another object of this invention is to provide a method of drying fruit which is not dependent upon vaporization of the moisture from the surface or the skin of the fruit for the drying thereof, but which includes means to greatly accelerate the removal of the free moisture from the surface of the fruit.

Another object of this invention is to provide a method of drying fruit which includes the passing of the fruit over a series of rotating brushes and subjecting the fruit to the action of a current of air during its passing.

Another object of this invention is to provide an apparatus for drying fruit which includes a series of rotating brushes for propelling fruit through a current of air so that the surface moisture of such fruit is dispersed into the atmosphere at a rate greatly in excess of that accomplished by vaporization.

Other objects and advantages of this invention it is believed will be apparent from the following detailed description of a preferred embodiment thereof as illustrated in the accompanying drawings.

In the drawings:

Figure 1 is a side elevation of a fruit drying apparatus embodying my invention.

Figure 2 is an end elevation thereof.

Figure 3 is a fragmental sectional view thereof.

Figure 4 is an enlarged fragmental side elevation of the fruit dryer embodying my invention.

I have discovered that fruit such, for example, as citrus fruit or the like, may be dried in a much less period of time and while passing the same over a very much reduced carriage where the fruit is passed over a conveyor formed over a plurality of brushes caused to revolve at a relatively high rate of speed while the fruit is subjected to a draft of air, the result being that the drying of the fruit is not dependent upon the rate of vaporization of the moisture from the surface of the fruit, but the moisture is mechanically removed from the surface of the fruit by the brushes revolving at such a relatively high rate and is thrown off from the brushes during their rotation.

In accordance with the preferred method of drying fruit embodying my invention, I pass the fruit such, for example, as oranges, over a series of brushes which are revolved at approximately 150 to 200 R. P. M. for brushes of four and one-half inch diameter while a current of air is simultaneously blown over the fruit.

In carrying out this method of drying the fruit I have found that the fruit need only pass over a conveyor so formed of about 15 feet in length, and only required about approximately one minute for complete drying of the fruit, whereas employing dryers as heretofore utilized, the fruit is caused to pass over a conveyor approximately 100 feet in length requiring a treatment of approximately ten minutes in order to dry the fruit. The exact explanation of the greatly increased drying efficiency utilizing the brushes revolving at relatively high speed is difficult. Several theories have suggested themselves, none of which appear to adequately set for the phenomena of the greatly increased drying efficiency obtained. The operation, however, is clearly a question of mechanical removal of the globules of liquid from the surface of the fruit rather than to depend upon the rate of vaporization of the water from the fruit surface.

The fruit is caused to pass over the revolving brushes by the rotation of the revolving brushes, combined with the crowding action of the fruit as it is fed onto the conveyor formed by the revolving brushes. I have found that with brushes of 4½ inch diameter that the speed of rotation of the brushes should not exceed 225 R. P. M. as a speed in excess of this amount causes the fruit to jump off the brushes. With a speed materially lower than 150 R. P. M., the water or liquid is not effectively mechanically removed from the surface of the fruit.

In carrying out the method embodying my invention, I prefer to employ a form of apparatus similar to that shown in the accompanying drawings in which drawings 1 represents a supporting frame which may be of any suitable or desirable construction upon which side rails 2 and 3 are supported. A series of revolving cylindrical brushes, preferably hair brushes, but not of necessity limited to hair brushes, are rotatably supported by the side rails 2 and 3 and are driven from a motor 5 supported on the frame 1. The cylindrical brushes 4 are revolved in the direction of travel of the oranges over the conveyor formed by the series of cylindrical brushes.

The motor 5 is operably connected to drive the brushes 4 by means of a chain 6 which is passed over idler sprocket 7 and is trained over sprockets 8 secured to the shafts 9 of each of the cylindrical brushes 4.

The chain 6 on leaving the last sprocket 9 of the last cylindrical brush 4, is returned along the rail 3 and is passed over idler sprocket 10 back to the drive sprocket 11 mounted on the shaft of the motor 5. The idler sprocket 10 is mounted on a shaft secured to which is a drive sprocket 12 for driving the chain 13. The chain 13 passes over a driven sprocket 14 mounted on the exterior of the box 15 of the dryer. The box 15 of the dryer is supported by, and is secured to, side rails 2 and 3 of the frame 1. A conveyor 16 is driven from the shaft upon which the sprocket 14 is mounted, and carries a pair of clean-out belts 17 which travel within the box 15 in the direction of movement of the fruit over the cylindrical brushes 4. The clean-out belts 17 are preferably formed of soft rubber and extend longitudinally with the cylindrical brushes 4 and act to prevent fruit from remaining in the dryer after the feeding of the fruit is stopped.

The conveyor 16 is passed over idler sprocket 18 mounted at the opposite end of the dryer box 15. The dryer box 15 extends for the full length of the cylindrical brushes 4 and provides an enclosed chamber over the brushes 4 through which the fruit is conveyed by the brushes 4. The top of the box 15 is provided with means for creating a current of air over the fruit as it is conveyed along the cylindrical brushes.

The current of air is blown over the fruit on the cylindrical brushes 4 in a direction opposed to the travel of the fruit through the box 15. The air circulating means includes a series of primary blowers 19, and a secondary blower 20 by which heated air is blown over the fruit to complete the drying of the fruit as it leaves the box 15.

The primary air blowers 19 are spaced along the dryer box 15 and include fan housings 21 mounted on the top of the dryer box 15 at an angle inclined from the vertical so that the current of air induced by the fan 22 is caused to revolve in the housings 21 and by means of motors 23 is directed into the dryer box 15 in a direction at an angle from and opposed to the direction of travel of the fruit through the box 15.

The secondary air circulating means 20 likewise includes an inclined housing 24 within which a fan 25 driven by a motor 26 is driven in substantially the same manner as the primary air circulating means 19. The secondary air circulating means includes an apron 27 which is secured to the housing 24 to enclose the fan 25 and motor 26, and in which apron heating means 28 are mounted for heating the air as it is drawn into the apron 27 and forced through the housing 24 against the fruit traveling through the box 15.

The heating means may be of any suitable or desirable construction and is herein illustrated as including a gas burner stove 29 connected to a heat transfer flue 30 mounted in the apron 27 so that the air drawn over the flue 30 is heated before it is forced by the fan 25 into the box 15. The flue 30 is connected at its end 31 to any suitable form of stack for conducting the burned gases away.

The box 15 of the dryer is closed on its sides by means of side plates 32, and at its top by means of the primary and secondary air circulating means 19 and 20, and at its bottom by means of the cylindrical brushes 4. The brushes 4 are spaced apart to permit air to blow between the brushes. The box 15 is open at its inlet and exit ends.

The side plates 32 are secured to bearing brackets 33 which are in turn secured to angle irons forming the side rails 2 and 3 on the opposite sides of the box. The rails 2 and 3 are secured to post heads 34 in which the posts 35 of the frame 1 are secured. Guides 36 are secured to the side plate 32 in position to guide and maintain the fruit on the brushes 4 within the box 15. Angle irons 37 are secured to the side plates 32 above the brush guides 36 and provide guides for the conveyor 16.

The air blast created by the primary and second air circulating means is directed onto the fruit on the conveyor formed by the cylindrical brushes 4 and acts not only to vaporize the moisture from the surface of the fruit but also conveys the globules of water, mist, etc., mechanically dispersed from the surface of the fruit by the revolving brushes 4 away from the dryer. The blast of air also aids in the drying of the cylindrical brushes thus aiding in the maintenance of the drying efficiency of the brushes.

Having fully described my invention, it is to be understood that I do not wish to be limited to the details herein set forth, but my invention is of the full scope of the appended claims.

I claim:

1. The method of drying fruit which includes moving the fruit through a path of travel, contacting the fruit with relatively high speed revolving brushes, revolving in the direction of travel of the fruit on axes substantially at right angles to the line of travel of the fruit, the rate of travel of the brushes being in the relation of 150-200 R. P. M. for brushes of 4½ inch diameter and conveying the liquid mechanically dispersed from the surface of the fruit away from the fruit with a current of air.

2. A method of drying fruit which includes conveying fruit to be dried through a drying chamber, brushing the surface of the fruit within the drying chamber, the direction of the brushing being as established by brushes revolving on axes transversely of the direction of travel of the fruit, the rate of brushing being sufficient to mechanically disperse liquid from the surface of the fruit, and carrying the dispersed liquid from the chamber in a current of air.

3. A method of drying fruit including the steps of passing the fruit over a succession of spaced revolving brushes arranged transversely to the path of travel of the fruit, simultaneously revolving said brushes in the direction of travel of the fruit at a speed sufficient to break up the moisture adhering to the fruit and throw the same off in the form of finely divided particles, and directing a blast of air to carry away to carry away the finely divided particles as the finely divided particles of moisture as they are thrown from the fruit.

4. A method of drying fruit including the steps of passing the fruit over a succession of spaced revolving brushes arranged transversely to the path of travel of the fruit, simultaneously revolving said brushes in the direction of travel of the fruit to provide a peripheral brush speed corresponding to 150 to 225 R. P. M. for brushes of 4½ inch diameter to break up the moisture adhering to the fruit and throw the same off in finely divided particles, and directing a blast of air to carry away the finely divided particles as they are thrown from the fruit.

5. A method of drying fruit including the steps of passing the fruit over a succession of spaced revolving brushes arranged transversely to the path of travel of the fruit, simultaneously revolving said brushes in the direction of travel of the fruit to provide a peripheral brush speed in excess of that corresponding to 150 R. P. M. for brushes of 4½ inch diameter to break up the moisture adhering to the fruit and throw the same off in finely divided particles, and directing a blast of air to carry away the finely divided particles as they are thrown from the fruit.

6. A method of drying fruit including the steps of passing the fruit over a succession of spaced revolving brushes arranged transversely to the path of travel of the fruit, simultaneously revolving said brushes in the direction of travel of the fruit at a speed sufficient to break up the moisture adhering to the fruit and throw the same off in the form of finely divided particles, directing a blast of air to carry away the finely divided particles of moisture as they are thrown from the fruit, and causing the advance of said fruit over said brushes by the feed of additional fruit thereto.

7. A method of drying fruit including the steps of passing the fruit over a succession of spaced revolving brushes arranged transversely to the path of travel of the fruit, simultaneously revolving said brushes in the direction of travel of the fruit to provide a peripheral brush speed corresponding to 150 to 225 R. P. M. for brushes of 4½ inch diameter to break up the moisture adhering to the fruit and throw the same off in finely divided particles, directing a blast of air they are thrown from the fruit, and causing the advance of said fruit over said brushes by the feed of additional fruit thereto.

8. A method of drying fruit including the steps of passing the fruit over a succession of spaced revolving brushes arranged transversely to the path of travel of the fruit, simultaneously revolving said brushes in the direction of travel of the fruit to provide a peripheral brush speed in excess of that corresponding to 150 R. P. M. for brushes of 4½ inch diameter to break up the moisture adhering to the fruit and throw the same off in finely divided particles, directing a blast of air to carry away the finely divided particles as they are thrown from the fruit, and causing the advance of said fruit over said brushes by the feed of additional fruit thereto.

9. A method of drying fruit including the steps of passing the fruit over a succession of revolving brushes arranged transversely to the path of travel of the fruit, simultaneously revolving said brushes in the direction of travel of the fruit at a speed sufficient to break up the moisture adhering to the fruit and throw the same off in the form of finely divided particles, and directing a blast of air to carry away the finely divided particles of moisture as they are thrown from the fruit.

10. In a fruit dryer, the combination of a drying chamber, means for moving fruit through the drying chamber, a plurality of drying substantially cylindrical brushes mounted in the drying chamber with their axes of rotation at substantially right angles to the travel of the fruit, means for rotating the brushes at such speed as to mechanically disperse liquid from the surface of the fruit, and means for creating a current of air in the chamber.

11. In an apparatus for drying fruit, a conveyor made up of a plurality of substantially cylindrical brushes mounted for rotation about axes transversely of the path of the fruit, means for rotating said brushes in a common direction at such speed as to mechanically disperse liquid from the surface of the fruit, and means for directing a current of air to carry away the moisture dispersed from the fruit.

FRANK B. ROBERTS.

CERTIFICATE OF CORRECTION.

Patent No. 1,981,197.　　　　　　　　　　　　　　　November 20, 1934.

FRANK B. ROBERTS.

It is hereby certified that error appears in the printed specification of the above numbered patent requiring correction as follows: Page 3, line 1, claim 3, strike out the words "to carry away the finely divided particles as" and insert the same before "they" in line 76, of claim 7; and that the said Letters Patent should be read with this correction therein that the same may conform to the record of the case in the Patent Office.

Signed and sealed this 26th day of February, A. D. 1935.

(Seal)

Leslie Frazer
Acting Commissioner of Patents.

to carry away the finely divided particles as the finely divided particles of moisture as they are thrown from the fruit.

4. A method of drying fruit including the steps of passing the fruit over a succession of spaced revolving brushes arranged transversely to the path of travel of the fruit, simultaneously revolving said brushes in the direction of travel of the fruit to provide a peripheral brush speed corresponding to 150 to 225 R. P. M. for brushes of 4½ inch diameter to break up the moisture adhering to the fruit and throw the same off in finely divided particles, and directing a blast of air to carry away the finely divided particles as they are thrown from the fruit.

5. A method of drying fruit including the steps of passing the fruit over a succession of spaced revolving brushes arranged transversely to the path of travel of the fruit, simultaneously revolving said brushes in the direction of travel of the fruit to provide a peripheral brush speed in excess of that corresponding to 150 R. P. M. for brushes of 4½ inch diameter to break up the moisture adhering to the fruit and throw the same off in finely divided particles, and directing a blast of air to carry away the finely divided particles as they are thrown from the fruit.

6. A method of drying fruit including the steps of passing the fruit over a succession of spaced revolving brushes arranged transversely to the path of travel of the fruit, simultaneously revolving said brushes in the direction of travel of the fruit at a speed sufficient to break up the moisture adhering to the fruit and throw the same off in the form of finely divided particles, directing a blast of air to carry away the finely divided particles of moisture as they are thrown from the fruit, and causing the advance of said fruit over said brushes by the feed of additional fruit thereto.

7. A method of drying fruit including the steps of passing the fruit over a succession of spaced revolving brushes arranged transversely to the path of travel of the fruit, simultaneously revolving said brushes in the direction of travel of the fruit to provide a peripheral brush speed corresponding to 150 to 225 R. P. M. for brushes of 4½ inch diameter to break up the moisture adhering to the fruit and throw the same off in finely divided particles, directing a blast of air they are thrown from the fruit, and causing the advance of said fruit over said brushes by the feed of additional fruit thereto.

8. A method of drying fruit including the steps of passing the fruit over a succession of spaced revolving brushes arranged transversely to the path of travel of the fruit, simultaneously revolving said brushes in the direction of travel of the fruit to provide a peripheral brush speed in excess of that corresponding to 150 R. P. M. for brushes of 4½ inch diameter to break up the moisture adhering to the fruit and throw the same off in finely divided particles, directing a blast of air to carry away the finely divided particles as they are thrown from the fruit, and causing the advance of said fruit over said brushes by the feed of additional fruit thereto.

9. A method of drying fruit including the steps of passing the fruit over a succession of revolving brushes arranged transversely to the path of travel of the fruit, simultaneously revolving said brushes in the direction of travel of the fruit at a speed sufficient to break up the moisture adhering to the fruit and throw the same off in the form of finely divided particles, and directing a blast of air to carry away the finely divided particles of moisture as they are thrown from the fruit.

10. In a fruit dryer, the combination of a drying chamber, means for moving fruit through the drying chamber, a plurality of drying substantially cylindrical brushes mounted in the drying chamber with their axes of rotation at substantially right angles to the travel of the fruit, means for rotating the brushes at such speed as to mechanically disperse liquid from the surface of the fruit, and means for creating a current of air in the chamber.

11. In an apparatus for drying fruit, a conveyor made up of a plurality of substantially cylindrical brushes mounted for rotation about axes transversely of the path of the fruit, means for rotating said brushes in a common direction at such speed as to mechanically disperse liquid from the surface of the fruit, and means for directing a current of air to carry away the moisture dispersed from the fruit.

FRANK B. ROBERTS.

CERTIFICATE OF CORRECTION.

Patent No. 1,981,197.      November 20, 1934.

FRANK B. ROBERTS.

It is hereby certified that error appears in the printed specification of the above numbered patent requiring correction as follows: Page 3, line 1, claim 3, strike out the words "to carry away the finely divided particles as" and insert the same before "they" in line 76, of claim 7; and that the said Letters Patent should be read with this correction therein that the same may conform to the record of the case in the Patent Office.

Signed and sealed this 26th day of February, A. D. 1935.

(Seal)

Leslie Frazer
Acting Commissioner of Patents.